United States Patent [19]
Kakalec et al.

[11] Patent Number: 5,982,598
[45] Date of Patent: *Nov. 9, 1999

[54] PROTECTIVE CIRCUIT FOR A GROUNDED POWER PLANT

[75] Inventors: Robert J. Kakalec, Madison, N.J.; Franklin F. Makan, Rockwall; Vijayan J. Thottuvelil, Plano, both of Tex.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/934,185

[22] Filed: Sep. 19, 1997

[51] Int. Cl.⁶ ....................................................... H02H 3/22
[52] U.S. Cl. ............................ 361/111; 361/65; 361/91.1
[58] Field of Search ...................... 361/56, 111, 117–119, 361/126–127, 91, 62–63, 65, 91.1; 379/412; 307/10.7, 39, 12; 363/50–53

[56] References Cited

U.S. PATENT DOCUMENTS

| | | | |
|---|---|---|---|
| 3,558,830 | 1/1971 | Bender | 379/377 |
| 4,389,695 | 6/1983 | Carpenter, Jr. | 361/55 |
| 4,695,916 | 9/1987 | Satoh et al. | 361/56 |
| 4,878,145 | 10/1989 | Lace | 361/118 |
| 4,901,183 | 2/1990 | Lee | 361/56 |
| 5,142,430 | 8/1992 | Anthony | 361/56 |
| 5,150,271 | 9/1992 | Unterweger et al. | 361/119 |
| 5,299,088 | 3/1994 | Honi et al. | 361/119 |
| 5,388,021 | 2/1995 | Stahl | 361/56 |
| 5,495,383 | 2/1996 | Yoshioka et al. | 361/56 |

*Primary Examiner*—Michael J. Sherry

[57] ABSTRACT

For use with a grounded power plant, capable of powering a load, having a power supply and a power distribution system, a protective circuit, including a voltage clamping device, coupled between a return conductor of the power distribution system and the ground, that attenuates voltage transients present in the return conductor of the power distribution system thereby preventing the voltage transients from damaging the load.

20 Claims, 2 Drawing Sheets

PROTECTIVE CIRCUIT FOR A GROUNDED POWER PLANT

TECHNICAL FIELD OF THE INVENTION

The present invention is directed, in general, to power electronics and, more specifically, to a protective circuit for a grounded power plant, a method that prevents voltage transients from damaging a load powered by the power plant and a power plant employing the same.

BACKGROUND OF THE INVENTION

Users have become increasingly reliant upon electronic systems to perform critical functions. Some electronic systems must be operative at all times. Telecommunication switches, for instance, route tens of thousands of calls per second. The failure of such systems, due to either equipment breakdown or loss of power, is unacceptable since it would result in the loss of millions of telephone calls and the severe disruption of commerce.

A number of factors may affect operational availability of a particular electronic system. Electronic systems are inherently susceptible to damage from voltage transients. A single-point ground system, commonly used in the United States, connects all equipment frames and a point in the return of the current carrying path in a particular electronic system to a single ground window. By providing a path directly to ground, the single-point ground protects the electronic system from transient voltages.

In addition to grounding protection, critical electronic systems typically rely on battery plants or other types of power plants to maintain a high level of operational availability. Battery plants use backup batteries to provide power, allowing the electronic systems to function even when commercial power is unavailable. Batteries in a battery plant may store a substantial amount of energy. Although necessary to allow the electronic systems to operate during a commercial power outage that may last for many hours, the substantial energy stored may become a liability under certain fault conditions. A fault occurring either in the electronic system, the power plant or a power distribution system may release some of the stored energy in the form of voltage or current transients. The transients may then travel through the single-point ground, causing considerable damage to other parts of the electronic system.

Accordingly, what is needed in the art is an apparatus and method for suppressing transient voltages caused by, for instance, faults in the electronic system or in the power distribution system.

SUMMARY OF THE INVENTION

To address the above-discussed deficiencies of the prior art, the present invention provides a protective circuit for use with a grounded power plant, capable of powering a load, having a power supply and a power distribution system. The protective circuit includes, in one advantageous embodiment, a voltage clamping device, coupled between a return conductor of the power distribution system and the ground, that attenuates voltage transients present in the return conductor of the power distribution system thereby preventing the voltage transients from damaging the load. In a related embodiment, the power distribution system includes a plurality of supply and return conductors that couple the power distribution system to the power supply.

When an interruption of current occurs from, for instance, the disabling of a feed to the load, coupled with an inductance in the ground path, voltage transients are induced on the power supply and return conductors of the power distribution system with respect to the ground. The voltage clamping device attenuates the voltage transients to a safe value, thereby preventing the voltage transients from damaging the load. The present invention recognizes that a single voltage clamping device between a return conductor of the power distribution system and the ground with respect to a power supply protects the entire load. A voltage clamping device, however, may alternatively be placed between each return conductor of the power distribution system (when multiple supply and return conductors are employed) and the ground and still be within the broad scope of the present invention.

In an alternative embodiment of the present invention, the load includes a plurality of supply and return conductors that to couple the power distribution system to a plurality of modules of the load. The power distribution system further includes a current interruption device associated with each supply conductor. The current interruption device disables a corresponding supply conductor when a fault-to-ground occurs thereby inducing the voltage transients in the return conductor of the power distribution system. As previously mentioned, a fault occurring either in the electronic system, the power plant or the power distribution system may release some of the stored energy in the form of voltage transients. The transients may then produce high voltages in the return conductors, causing considerable damage to other parts of the electronic system. The voltage clamping device attenuates the transients thereby protecting the load.

In an alternative embodiment of the present invention, the voltage clamping device is a metal oxide varistor. Those skilled in the art should understand that the use of any voltage clamping device (including, for instance, a RC network) is well within the broad scope of the present invention.

In an alternative embodiment of the present invention, the power supply is located a substantial distance from said power distribution system. In a related, but alternative embodiment, the power supply and the load are located a substantial distance from to the ground. Obviously, the greater the distances between the components of the power plant, the larger the inductance present in the ground path thereby further amplifying the need for the protective circuit.

In another aspect, the present invention provides a grounded power plant for powering a telecommunications switch. The power plant includes (1) a power supply coupled to a source of electrical power and having a battery, (2) a power distribution frame (PDF), coupled to the power supply, that distributes power to the telecommunications equipment and (3) a protective circuit, including a voltage clamping device, coupled between a return conductor of the PDF and the ground, that attenuates voltage transients present in the return conductor thereby preventing the voltage transients from damaging the telecommunications equipment.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as to a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
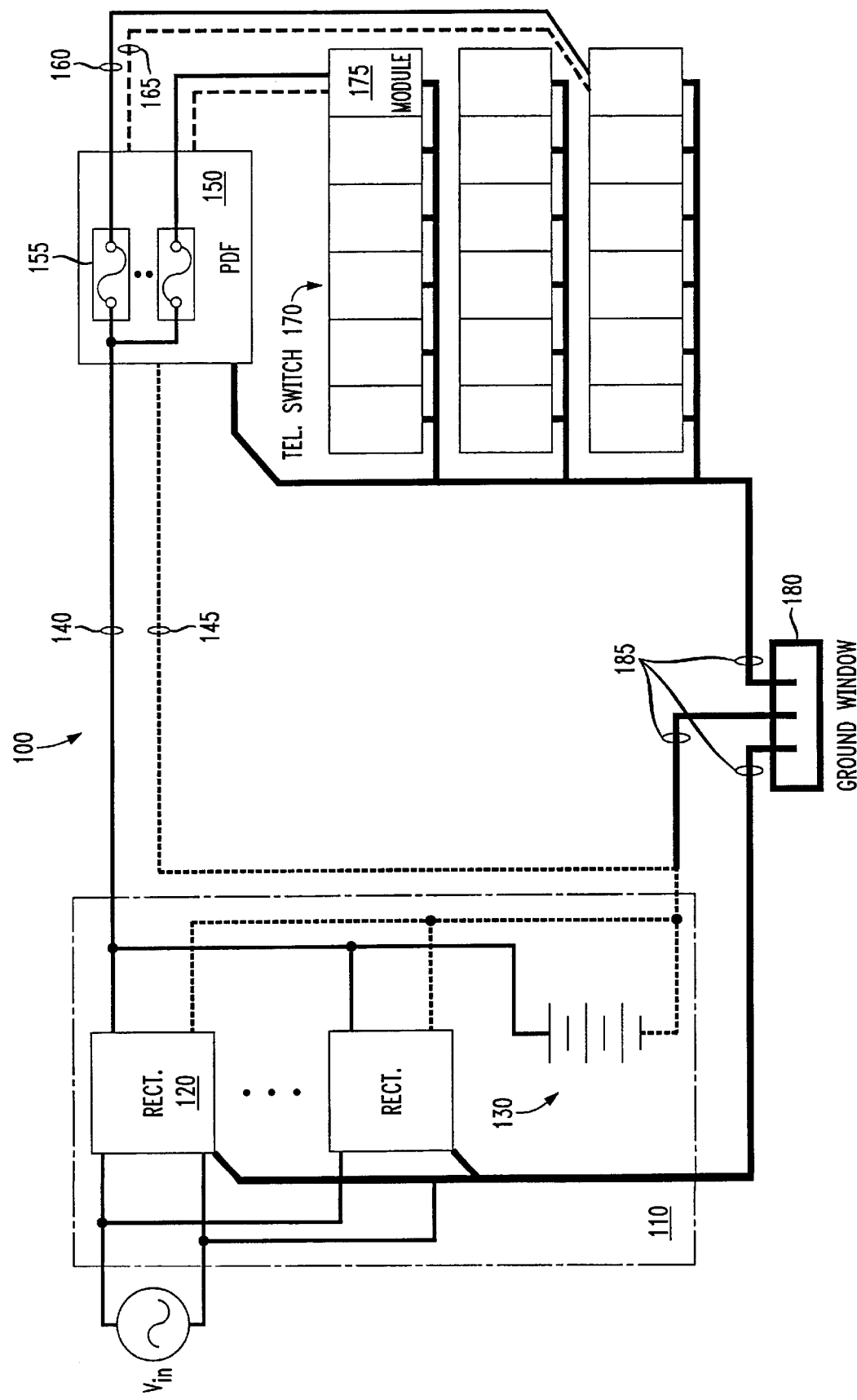
FIG. 1 illustrates a prior art power plant.

Referring initially to FIG. 1, illustrated is a prior art power plant 100. The power plant 100 includes a power supply 110 coupled to an input source of electrical power VIN. The power supply 110 includes a plurality of rectifiers (one of which is designated 120) and at least one battery 130. The power plant 100 further includes a power distribution frame 150 (PDF; an example of a power distribution system), coupled to the power supply 110 by a distribution network consisting of supply and return conductors 140, 145. The PDF 150 distributes power from the power supply 110 to, for instance, telecommunications equipment (e.g., a telecommunications switch) 170. The PDF 150 also includes one or more fuses (one of which is designated 155) or other current interruption device for current overload protection. The power supply 110, the PDF 150, and the telecommunications switch 170 are grounded at a ground window or single-point ground 180 via ground conductors (generally designated 185).

In the power plant 100, the PDF 150 is located proximate to the telecommunications switch 170 being powered. The power supply 110, however, is located a substantial distance away due to the physical size of the telecommunications switch 170 and power plant 100 in general. The distribution network carries DC power from either the rectifiers 120 and/or the battery 130 to the PDF 150. The PDF 150, in turn, distributes power to modules (e.g., load equipment frames; one of which is designated 175) of the telecommunications switch 170 via supply and return conductors (one pair of which are designated 160, 165) protected by the fuse 155.

When a fault-to-ground occurs, either in the PDF 150 or in a unit of the telecommunications switch 170, the fuse 155 opens, disabling the corresponding supply conductor 160. A sudden interruption of current from the opening of the fuse 155, coupled with a substantial inductance in the ground path (due to the substantial distance between the telecommunications switch 170 and the ground window 180), may create large transient voltages. The transient voltages appear on the return conductor 145 of the distribution network with respect to the ground window 180 or a frame ground of the telecommunications switch 170. Depending on the rate of change of the current in the system, the transient voltages may be of such magnitude as to cause other unrelated units in the telecommunications switch 170 to malfunction. The failure of the unrelated units is a result of large voltages in the paths in the single-point ground system.

One solution to this problem has been to select fuses that are oversized, but produce a slower rate of change of current upon opening, thereby creating smaller transient voltages. For certain situations, this solution may be sufficient to reduce the transient voltages to a non-damaging level. In general though, this approach does not adequately resolve the problem of transient voltages resulting from faults-to-ground.

Figure 2:
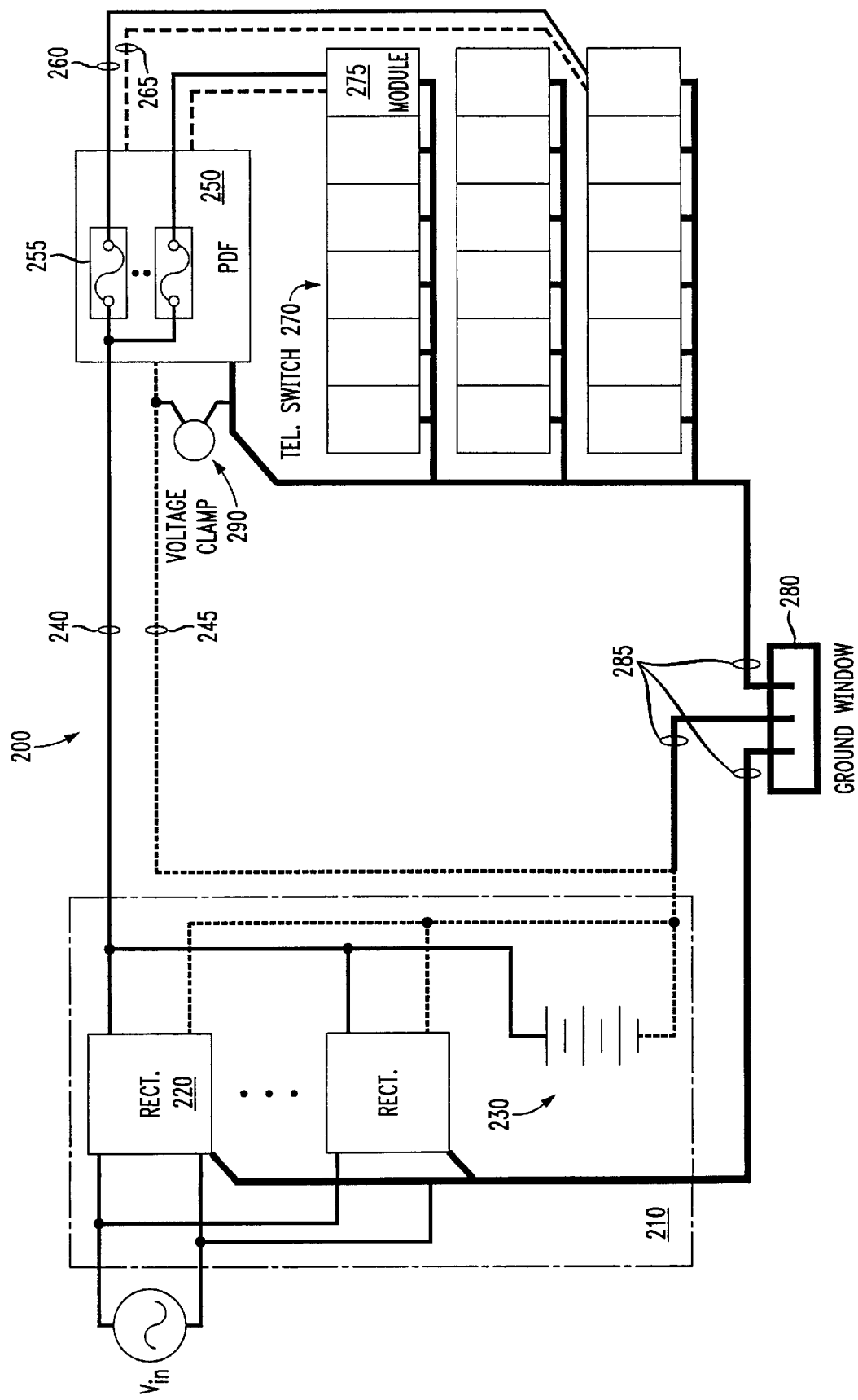
FIG. 2 illustrates a representative power plant constructed according to the principles of the present invention.

Turning now to FIG. 2, illustrated is a representative embodiment of a power plant 200 constructed according to the principles of the present invention. The power plant 200 includes a power supply 210 coupled to a source of electrical power $V_{IN}$. The power plant 200 further includes a PDF 250 (power distribution system), coupling the power supply 210 to a load. In the illustrated embodiment, the load is a telecommunications switch 270. Of course, any load may be used with the power plant 200. The power supply 210, the PDF 250, and the telecommunications switch 270 are grounded at a ground window or single-point ground 280 via ground conductors (collectively designated 285). Those skilled in the art understand, however, that the present invention is not limited to single-point ground systems.

The power supply 210, a battery plant in this case, includes a plurality of rectifiers (one of which is designated 220) for converting an AC input voltage from the source of electrical power $V_{IN}$ into a DC voltage used to power the telecommunications switch 270. The power supply 210 also includes at least one battery 230 for use as a source of redundant power. Of course, the broad scope of the present invention is not limited to use with batteries.

The PDF 250 receives power from the power supply 210 through a distribution network consisting of supply and return conductors (one pair of which is designated 240, 245). Of course, a plurality of supply and return conductors may also be employed herewith. The PDF 250 distributes this power to the telecommunications switch 270 via supply and return conductors (one pair of which is designated 260, 265) to modules (one of which is designated 275) of the telecommunications switch 270. The PDF 250 includes a fuse 255 that disables the corresponding supply conductor 260 when a fault-to-ground occurs. Those skilled in the art should understand that the fuse 255 is presented for illustrative purposes only and that the use of any current interruption device (e.g., a circuit breaker) is well within the broad scope of the present invention. The PDF 250 further includes a protective circuit, consisting of a voltage clamping device 290, coupled between the return conductor of the PDF 250 and the single-point ground 280. The voltage clamping device 290 may be coupled to a single return conductor 245 or coupled to each return conductor in a multiple conductor distribution network. The voltage clamping device 290, in the illustrated embodiment, consists of a metal oxide varistor. Although this particular embodiment of the present invention uses the metal oxide varistor, those skilled in the art should understand that the use of any voltage clamping device 290 is well within the broad scope of the present invention.

For various reasons (including safety precautions), the power supply 210 is normally located a substantial distance away from the PDF and the telecommunications switch 270 (e.g., 30 feet or more). The PDF 250 is typically located close to the telecommunications switch 270. The single-point ground 280 is usually located between the power supply 210 and the telecommunications switch 270, but still a substantial distance from both (e.g., 50 feet or more).

When a fault-to-ground is created either in the PDF 250 or in the telecommunications switch 270, (e.g., by accidental shorting of the supply conductor to frame ground during installation, or by component failure) the fuse 255 in the PDF 250 opens. Interruption of current from the opening of the fuse 255, coupled with a substantial inductance in the ground path (due to the substantial distance between the telecommunications switch 270 and the single-point ground 280), induces voltage transients on the return conductor 245 with respect to the ground conductors 285. The voltage clamping device 290 attenuates the voltage transients to a safe value, thereby preventing the voltage transients from damaging the telecommunications switch 270.

Although the present invention has been described in detail, those skilled in the art should understand that they can make various changes, substitutions and alterations herein without departing from the spirit and scope of the invention in its broadest form.

What is claimed is:

1. For use with a grounded DC power plant capable of powering a load and having a ground with substantial inductance, a DC power supply and a DC power distribution system coupled to an output of said DC power supply, a protective circuit, comprising:

a current interruption device located within said DC power distribution system; and a voltage clamping device, proximate said DC power distribution system and coupled between a return conductor of said DC power distribution system and said ground, that cooperates with said current interruption device to attenuate voltage transients between said return conductor and said ground created by an operation of said current interruption device and exacerbated by said substantial inductance, said protective circuit thereby substantially protecting said load from said voltage transients.

2. The circuit as recited in claim 1 wherein said power distribution system comprises a plurality of supply and return conductors that couple said power distribution system to said power supply.

3. The circuit as recited in claim 1 wherein said load comprises a plurality of supply and return conductors that couple said power distribution system to a plurality of modules of said load, said power distribution system comprises a current interruption device associated with each supply conductor, said current interruption device disabling a corresponding supply conductor when a fault-to-ground occurs thereby inducing said voltage transients in said return conductor of said power distribution system.

4. The circuit as recited in claim 1 wherein said voltage clamping device is a metal oxide varistor.

5. The circuit as recited in claim 1 wherein said power supply is located a substantial distance from said power distribution system.

6. The circuit as recited in claim 1 wherein said power supply and said load are located a substantial distance from said ground.

7. The circuit as recited in claim 1 wherein said power supply comprises a plurality of rectifiers.

8. For use with a grounded DC power plant capable of powering a load and having a ground with substantial inductance, a DC power supply and a DC power distribution system coupled to an output of said DC power supply, a method that substantially protects said load from voltage transients comprising:

locating a current interruption device within said DC power distribution system;

coupling a voltage clamping device proximate said DC power distribution system and between a return conductor of said DC power distribution system and said ground; and attenuating said voltage transients between said return conductor and said ground created by an operation of said current interruption device and exacerbated by said substantial inductance with said voltage clamping device.

9. The method as recited in claim 8 wherein said power distribution system comprises a plurality of supply and return conductors that couple said power distribution system to said power supply.

10. The method as recited in claim 8 wherein said load comprises a plurality of supply and return conductors that couple said power distribution system to a plurality of modules of said load, said power distribution system further comprises a current interruption device associated with each supply conductor, said method further comprising disabling a corresponding supply conductor with said current interruption device when a fault-to-ground occurs thereby inducing said voltage transients in said return conductor of said power distribution system.

11. The method as recited in claim 8 wherein said voltage clamping device is a metal oxide varistor.

12. The method as recited in claim 8 wherein said power supply is located a substantial distance from said power distribution system.

13. The method as recited in claim 8 wherein said power supply and said load are located a substantial distance from said ground.

14. The method as recited in claim 8 wherein said power supply comprises a plurality of rectifiers.

15. A grounded DC power plant for powering telecommunications equipment, comprising:

a DC power supply coupled to a source of electrical power and having a battery;

a DC power distribution frame, coupled to said DC power supply through a supply and return conductor and a ground with substantial inductance, that distributes power to said telecommunications equipment; and a protective circuit, comprising:

a current interruption device located within said DC power distribution frame; and a voltage clamping device, proximate said DC power distribution frame and coupled between said return conductor of said DC power distribution frame and said ground, that cooperates with said current interruption device to attenuate voltage transients between said return conductor and said ground created by an operation of said current interruption device and exacerbated by said substantial inductance, said protective circuit thereby substantially protecting said telecommunications equipment from said voltage transients.

16. The power plant as recited in claim 15 wherein said telecommunications equipment comprises a plurality of supply and return conductors that couple said power distribution frame to a plurality of modules of said telecommunications equipment, said power distribution frame further comprises a current interruption device associated with each supply conductor, said current interruption device disabling a corresponding supply conductor when a fault-to-ground occurs thereby inducing said voltage transients in said return conductor of said power distribution frame.

17. The power plant as recited in claim 15 wherein said voltage clamping device is a metal oxide varistor.

18. The power plant as recited in claim 15 wherein said power supply is located a substantial distance from said power distribution frame.

19. The power plant as recited in claim 15 wherein said power supply and said telecommunications equipment are located a substantial distance from said ground.

20. The power plant as recited in claim 15 wherein said power supply comprises a plurality of rectifiers.

* * * * *